United States Patent [19]

Apple, Jr.

[11] 4,016,368

[45] Apr. 5, 1977

[54] FRAMING CIRCUIT FOR DIGITAL RECEIVER

[75] Inventor: Garrett Gordon Apple, Jr., Huntington Beach, Calif.

[73] Assignee: North Electric Company, Galion, Ohio

[22] Filed: Dec. 12, 1975

[21] Appl. No.: 640,334

[52] U.S. Cl. .......................... 179/15 BS; 178/69.1
[51] Int. Cl.² .......................................... H04J 3/06
[58] Field of Search ............. 179/15 BS; 178/69 R, 178/69.5; 340/146.1 D

[56] References Cited

UNITED STATES PATENTS

| | | | |
|---|---|---|---|
| 3,742,139 | 6/1973 | Boehly et al. | 178/69.5 R |
| 3,766,316 | 10/1973 | Hoffman et al. | 178/69.5 R |
| 3,830,980 | 8/1974 | Peron et al. | 178/69.5 R |
| 3,854,011 | 12/1974 | Mallory et al. | 179/15 BS |
| 3,903,371 | 9/1975 | Colton et al. | 179/15 BS |
| 3,920,900 | 11/1975 | Fineman | 179/15 BS |
| 3,940,563 | 2/1976 | Susset | 179/15 BS |

Primary Examiner—Douglas W. Olms
Attorney, Agent, or Firm—Johnson, Dienner, Emrich & Wagner

[57] ABSTRACT

In the T1 PCM carrier system there are 193 bits per frame, 192 of which are used for the channels. The D1 channel bank uses the 193rd bit to identify the division between frames, with a pattern from frame to frame of ... 010101 .... The D2 channel bank uses the 193rd bit of alternate frames, or every 386th bit for framing. Both D1 and D2 have a framing circuit to identify the framing bit by the pattern with a normal mode and a search mode. There is a violation monitor for comparing the pattern of framing bits from frame to frame and indicating a violation if there is a deviation. In the normal mode only the framing bits are examined, and some error tolerance is allowed. Violations are registered in a memory device to check if a preset threshold is exceeded. When the threshold is exceeded, a misframe is declared, and the circuit goes into a search mode to examine other bit positions for the framing pattern. No error tolerance is allowed in the search mode. After a framing pattern is found, a confidence circuit with a memory checks whether the pattern persists for a predetermined number of frames before returning to the normal mode, and searching other bit positions if the pattern does not persist.

16 Claims, 9 Drawing Figures

FIGURE 1 FRAMING MODES

FIGURE 2 BASIC DI ALGORITHM

FIGURE 3 NORMAL MODE STATES

FIGURE 4 SEARCH MODE STATES

FIGURE 6 BASIC D2 ALGORITHM

FIGURE 7 D2 SEARCH MODE STATES

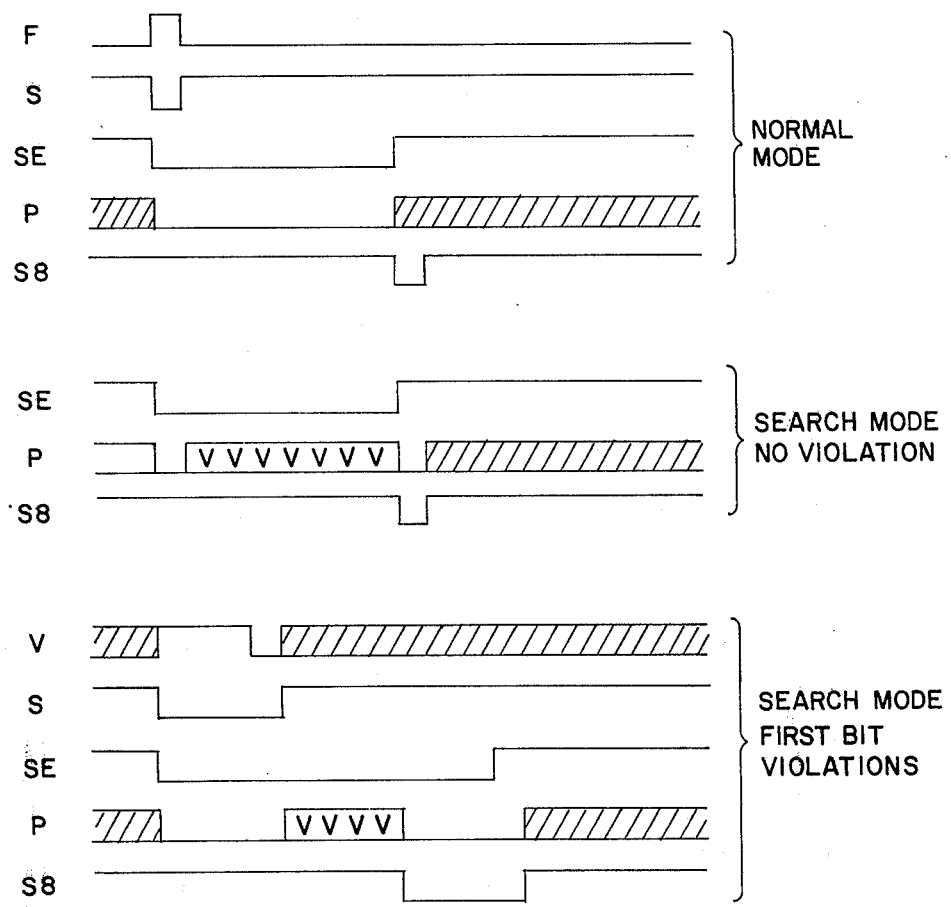
FIGURE 9 EXAMPLES OF FRAMING CONTROLS

FRAMING CIRCUIT FOR DIGITAL RECEIVER

BACKGROUND OF THE INVENTION

This invention relates to a framing circuit for a digital receiver, and more particularly to a circuit arrangement for finding a frame bit which occurs in every frame or alternate frame to synchronize a data receiver, and to maintain it in synchronization.

In digital transmission systems, particularly carrier systems for sending voice signals in digital format, the data bits are transmitted in cyclically recurring frames. There are usually a number of channels, each having a recurring time slot in each frame. One such system is known as Tl carrier, which may have either type D1 or Type D2 channel banks in the multiplexing equipment.

When looking at a data stream, one bit pretty much looks like any other. The purpose of framing is to establish a time reference so that the data can be identified and properly routed or decoded. The data is usually organized into fixed blocks and the blocks are usually separated by a framing bit. In Tl D1 format, the data block is organized as 24 channels of 8 bits each which results in 192 bits. One framing bit is added giving a total of 193 bits.

The frame bit is identified by following a distinctive sequence that is not likely to occur for any long period of time in the data stream. In normal operation, when the circuit is in frame, no data sequence can disrupt the framing. The framing circuit looks only at the framing bits and not at the data. If substantial deviation from the framing sequence occurs, then a misframe is declared and a frame search starts. Only then does the framing circuit look at the data. This is when the framing circuit is vulnerable to data sequences that look like framing. Such a pattern would not be expected to persist indefinitely and and so a frame search would eventually be reinitiated. The search is systematic through all 193 bit positions and correct framing is declared only when sufficient confidence is achieved that the sequence is true framing and not just a similar data pattern. Some error tolerance is allowed in the normal mode so that random bit errors do not cause a misframe. No error tolerance is allowed during the search mode.

The D1 framing sequence consists of the alternating patter ... 010101 .... If a variation from this pattern occurs then it is referred to as a "violation". The normal mode consists of counting the 193 bits of the frame and checking for a framing violation. If a violation occurs, then that violation is registered in some sort of decaying memory device and a check is made to see if a preset threshold is exceeded. If the threshold is not exceeded, then the framing circuit continues to the next frame. If enough violations occur in close succession, the threshold is exceeded and a misframe is declared and a framing search is initiated. When the search mode is started, the frame counter slips 1 bit before resuming its count. At the end of the 193 count, a check is made to see if there is a violation. If there is a violation, then the search process is reinitiated immediately. If no violation occurs, then there is a possibility that the framing is correct. In this case, a memory device is incremented and a check is made to determine if enough consecutive non-violations have occurred to declare a correct frame. If not, then the next frame is examined to see if the pattern still persists. If enough consecutive non-violations occur, then confidence is high that the correct framing has been detected. A true frame is declared returning the framing circuit to the normal mode. The monitor for non-violations in the search mode is referred to as a "confidence circuit". Any violation during the search mode wipes out confidence in that position being correct. Random data could look like framing for a short period of time. The confidence circuit is necessary to insure that the probability of data looking like framing is sufficiently small that a correct frame can be declared and a return to the normal mode can be accomplished.

The violation monitoring is done in the D1 channel bank by pulsing a leaky capacitor. Every time a violation occurs, the voltage on the capacitor is increased by a fixed amount. The charge will eventually leak off, but enough violations in a short period of time will generate enough voltage on the capacitor so that the threshold is reached and a misframe is declared. The exact values of the components are not critical. The threshold may be reached when the three consecutive framing bits are in violation or when approximately three out of five consecutive framing bits are in violation. For the D2 channel bank, about four closely spaced violations are necessary to cause misframe.

The main difference in D2 framing is that the framing bit appears only in the 193rd position in alternate frames while the other 193rd bit is used for other things such as identifying signaling frames or carrying common channel signaling. The framing bit alternates just as in D1. The resulting sequence in the 193rd bit position is ... $0x1x0x1x0x1x$ ... where $x$ can be anything except the alternating sequence. As far as the reframe circuit is concerned, the frame is length 386 instead of 193 and every 386th bit is a framing bit following the same pattern as D1. The difficulty arises from the fact that if the D2 reframe circuit is used the reframe time is four times as long as D1. This fact comes from the rule that reframe time is proportional to the square of the frame length.

In order to speed up the D2 reframe process, 8 bits are examined at a time. The first of the 8 bits is considered to be the prime candidate and the others are considered in succession. As long as the first bit follows the correct pattern, then no action is taken until a confidence counter reaches a threshold which says that sufficient confidence in the prime candidate has been attained so that a true frame can be declared. During the time that the candidate is being considered, a history of past violations is being accumulated on the other 7 bits. In the event that the candidate fails, the second bit can be examined with a past history that indicates whether or not it should be considered. If there have been any violations in that position since the frame search began, then the second bit is immediately eliminated from contention and the third bit is examined in the same manner. This process continues until a contender is found or else all 8 bits are exhausted. Whenever a contender is found, then it is declared to be the new prime candidate and the confidence counter is restarted from zero. In this manner, up to eight non-framing positions cn be eliminated at a time rather than having to examine each position individually. Bits which are not frame bits can be skipped over fairly rapidly so that the total reframe time is improved considerably. In fact, the D2 channel bank reframes a little faster than D1. The normal mode of the Bell System D2 channel bank has approximately the same error tolerance and misframe method as D1.

Other framing patterns and circuits are also known. See for example U.S. Pat. No. 3,585,306 by F. E. Battocletti, Columns 5 – 7.

SUMMARY OF THE INVENTION

An object of this invention is to provide a simple and effective framing circuit with all digital logic components.

According to the invention, a generalized sequential controller provides both the threshold control for the normal mode and the confidence control for the search mode. For each mode there are a number of sequence states. The sequential controller may, for example, comprise a read only memory or a programmed logic array, along with a number of flip-flops coupled between the memory outputs and inputs for storing the sequence states. A line interface derives trains of clock pulses and data bits from the transmission line. A framing counter counts the clock pulses to supply a framing bit signal to an input of the sequential controller. A violation monitor stores the framing bit from the train of data bits, and compares the stored bit with the current bit to supply a violation indication to an input of the sequential controller. When the framing bit indication is true, a set output of the controller sets the framing counter to its initial state, and gates the bit from the data train into storage in the violation monitor. In the normal mode, if there have been no recent violations of the framing pattern, the sequence remains in a base normal state. When the framing bit indication is true, a violation causes an increase by a number of states, and with no violation the state decreases toward the base at a slower rate. If enough violations occur in close succession, a preset threshold is exceeded, a misframe declared, and a framing search is initiated by going to a base search mode state. In the search mode, the base state is used to produce an additional set output to reset the framing counter to thereby slip a bit, and to place another bit from the data train in the violation monitor store. On succeeding occurrences of the framing bit indication, if there is no violation the sequence state advances, whereas if there is a violation the sequence state returns to the base search mode state to slip another bit. The advancing of states in the search mode is the confidence control. When the state reaches a preset value, this indicates sufficient confidence of correct framing, and on the next framing bit indication there is a return to the normal mode base state.

In an embodiment for D1 framing, the framing counter produces a framing bit indication every 193rd bit. The violation monitor comprises a single flip-flop and a comparator.

In an embodiment for D2 framing, the framing counter produces a framing bit indication every 386th bit. The violation monitor comprises two 8-bit shift registers, one for data bits and one for a past history of violations in the search mode. Another 8-bit shift register and gate uses the set output to provide a shift enable to the violation monitor shift registers extending to seven additional bits after the set output. In the normal mode, this shifts the framing bit to the end of the data bit shift register for comparison with the current data bit on the next occurrence of a framing bit indication, while zeros are loaded into the past history shift register. In the search mode, 8 bits may be examined for each occurrence of a framing bit indication. An additional input to the controller from the end of the set-signal shift register provides information as to when the eight bit window is ended and also forces the past history indication to zero if the window is extended. The past history indication is an added output from the controller to the past history shift register; this indication being made equal to he violation indication except when it must be set to zero.

DESCRIPTION OF THE DRAWINGS

FIG. 9 is a set of graphs showing examples of framing controls for the D2 circuit.

DESCRIPTION OF EMBODIMENT FOR D1 CHANNEL BANK

Figure 1:
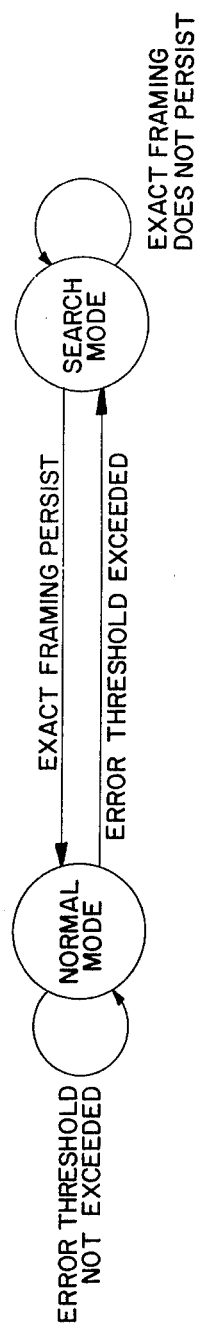
FIG. 1 is a general flowchart.

A general flowchart of the two modes of operation of a framing circuit is shown in FIG. 1. The conditions for mode change are also shown. In the normal mode of operation, when the circuit is in frame no data sequence can disrupt the framing. The framing circuit looks only at the framing bits and not at the data. A violation monitor checks for errors in a predetermined pattern for the framing bits from frame to frame. Some error tolerance is allowed for this pattern in the normal mode so that random bit errors do not cause a misframe. The violation monitor is designed to provide an error threshold. As long as this threshold is not exceeded, the circuit remains in the normal mode. If the error threshold is exceeded, the circuit goes into the search mode.

In the search mode, the framing circuit looks at data. The search is systematic through all 193 bit positions and correct framing is declared only when sufficient confidence is achieved that the sequence is true framing and not just a similar data pattern. No error tolerance is allowed during the search mode. If the exact framing pattern does not persist from frame to frame, the circuit remains in the search mode and continues to check different bit positions. Once sufficient confidence has been achieved because the exact framing pattern persists for a number of frames, the circuit returns to the normal mode of operation.

Figure 2:
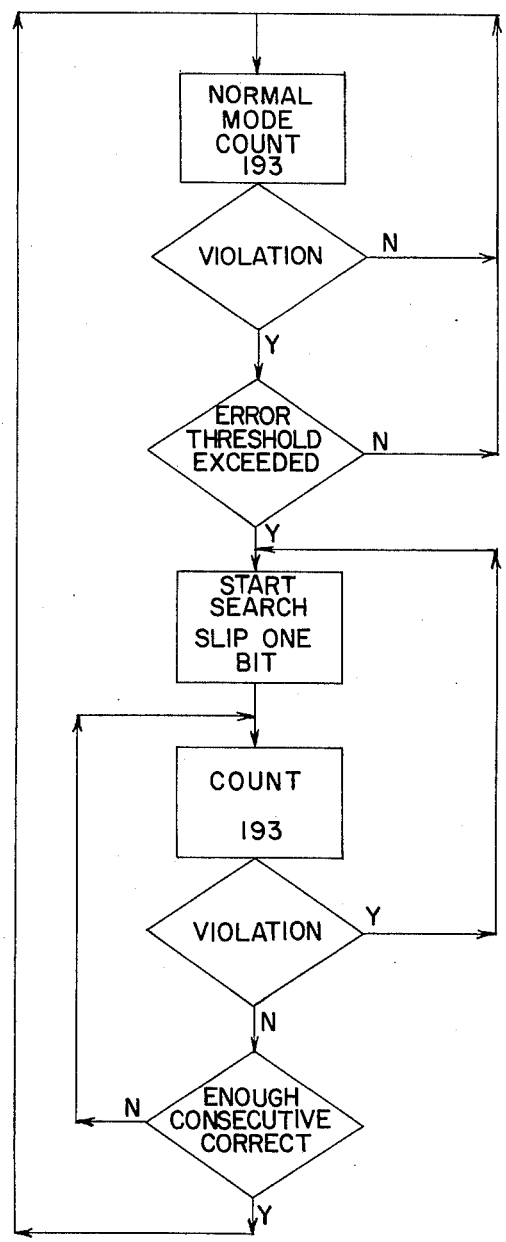
FIG. 2 is a flowchart of the basic D1 algorithm.

A flowchart of the basic framing algorithm is shown in FIG. 2. The D1 framing sequence consists of the alternating pattern . . . 010101 . . . . If a variation from this pattern occurs then it is referred to as a "violation". In FIG. 2, the normal mode consists of counting the 193 bits of the frame and checking for a framing violation. If a violation occurs, then that violation is registered in some sort of decaying memory device and a check is made to see if a preset threshold is exceeded. If the threshold is not exceeded, then the framing circuit continues to the next frame. If enough violations occur in close succession; the threshold is exceeded, a misframe is declared, and a framing search is initiated. When the search mode is started, the frame counter slips one bit before resuming its count. At the end of the 193 count, a check is made to see if there is a violation. If there is a violation, then the search process is reinitiated immediately. If no violation occurs, then there is a possibility that the framing is correct. In this case, a memory device is incremented and a check is made to determine if enough consecutive non-violations have occurred to declare a correct frame. If not, then the next frame is examined to see if the pattern still persists. If enough consecutive non-violations occur, then confidence is high that the correct framing has been detected. A true frame is declared returning the framing circuit to the normal mode. The monitor for non-violations in the search mode is referred to as a "confidence circuit". Any violation during the search mode wipes out our confidence in that position being correct. Random data could look like framing for a short period of time. The confidence circuit is necessary to insure that the probability of data looking like framing is sufficiently small that a correct frame can be declared and a return to the normal mode can be accomplished.

It is necessary with the given algorithm to define the violation monitoring method and threshold for the normal mode and to define the method used by the confidence circuit in the search mode. A totally digital approach is desirable. One way of doing this is illustrated by means of a state diagram in FIG. 3. State AO corresponds to a ground state and if no violation occurs then the circuit remains in that state. A violation will cause an increment of three states to state A3. If no further violations occur, then a decrease of one state per frame occurs until state AO is reached. If the state is A3 and another violation occurs, then there is another jump of three states to A6. If the next state is in violation, then a jump to state BO occurs and a misframe is declared. If there are no violations in any of the A states, then transitions occur once per frame towards AO until state AO is reached. This corresponds to a linear rather than exponential leakage on a capacitor. The increase by three for violations corresponds to pulsing the capacitor. Any three violations out of four frame bit locations or four violations out of eight frame bit locations will cause a misframe. Also any sustained sequence where more than 25% of the frame bits are in violation will cause a misframe.

Transitions are only allowed during the framing bit time. Also, the present framing bit must be stored for comparison during the next framing bit time. A counter is arranged as a 192 count followed by a 1 bit delay to get the 193rd or framing bit. After the framing bit, the counter is set to zero to begin counting the next frame. A violation detector compares the present frame bit with the last frame bit stored in a flip-flop. When the counter is set to zero, a flip-flop is also enabled so that the present framing bit is stored for the next comparison one frame later.

Figure 4:
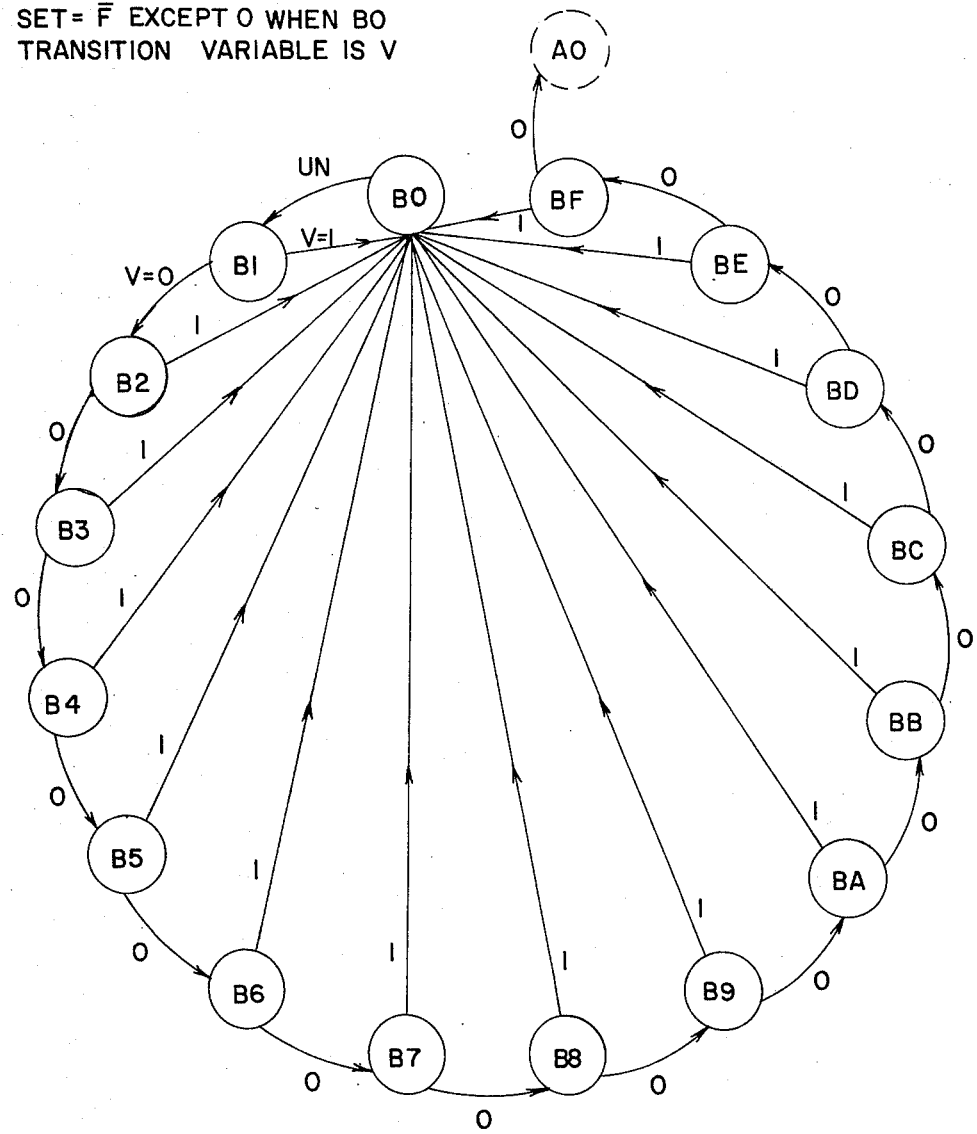
FIG. 4 is a flowchart of the D1 search mode states.

The confidence circuit declares a true frame after 15 consecutive non-violations, which is a convenient number and is completely adequate to prevent false reframes. The state transition diagram in FIG. 4 shows an initial state BO followed by counting states Bl through BF where the states are numbered with hexadecimal notation. The initial state BO causes an additional set signal to be applied to the 192 counter and the storage flip-flop. A transition from BO to Bl occurs on the next clock pulse no matter what inputs are present. All other transitions occur at the end of a 193 count. If no violations occur, then the progression of states is such that 15 correct frames will return the system to state AO and thus return to the normal mode. Any violations during the progression results in return to BO, skipping another bit, and starting the sequence over again. By the time the progression has reached state BF, there is almost complete confidence that correct framing has been achieved. The return to AO then means a return to an error tolerant mode so that the noise should not cause further misframes. The probability of noise causing the framing circuit to miss the correct frame during the search mode is very low since the fraction of time spent in this mode is very small. If such a miss does occur the penalty is not severe since it only results in restarting the search.

It should be noted that the set of A states corresponds to the mode shown on the left side of FIG. 1 and the B states correspond to the mode shown on the right side.

Figure 5:
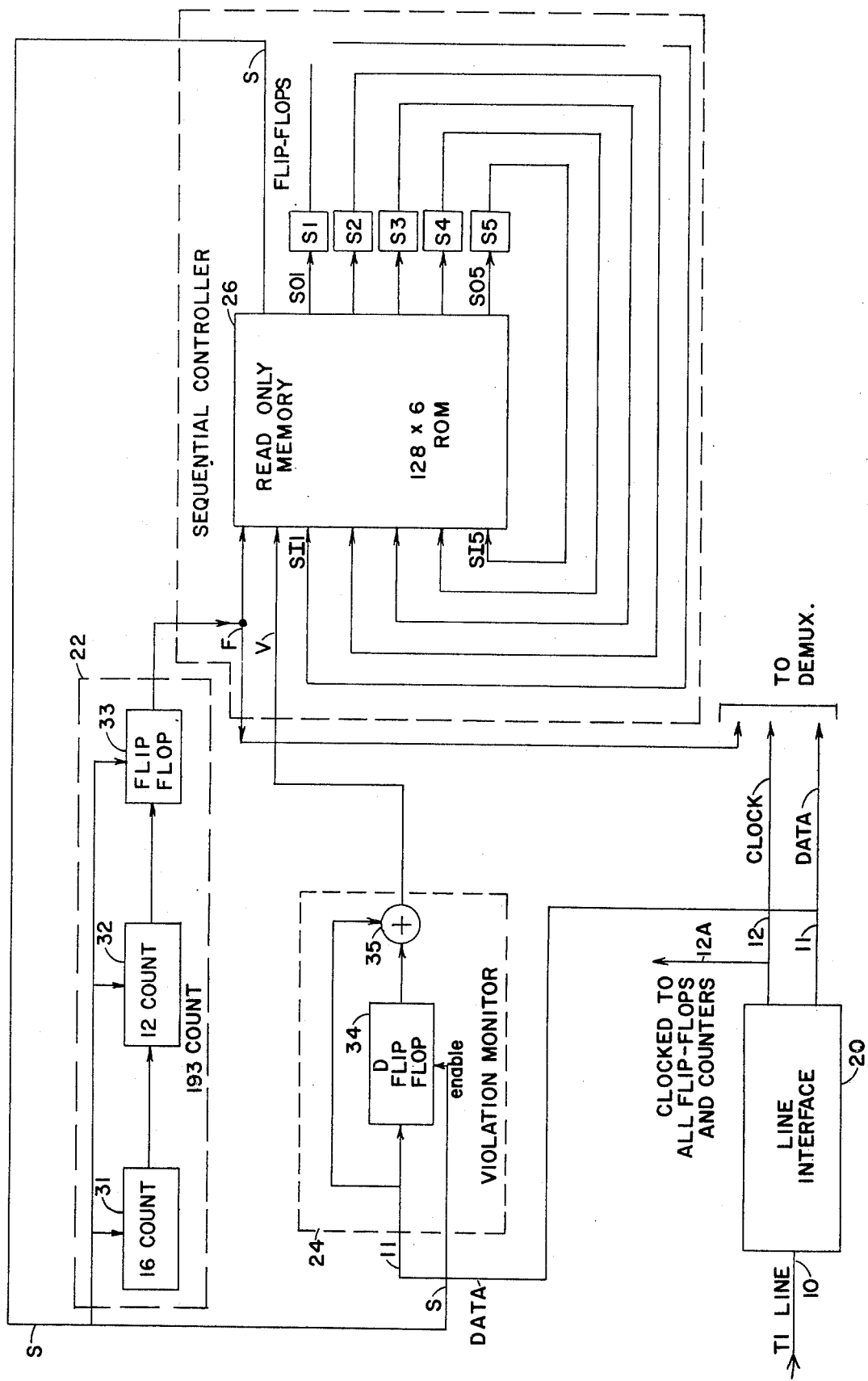
FIG. 5 is a functional block diagram of a D1 framing circuit

The functions represented by the flowcharts of FIGS. 1 – 4 can be performed by the circuit shown in FIG. 5. A Tl line 10 has a usual line interface 20 which repeats the data bit stream to lead 11 and supplies a train of clock pulses at the same frequency on lead 12. A counter 22 is arranged as a 192 count followed by a one-bit delay to get the 193rd or framing bit on output lead F. After the framing bit, the counter is set to zero by a zero signal on lead S to begin counting the next frame. The 192 count may be conveniently obtained by a 16-step counter 31 followed by a 12-step counter 32. The one bit delay is provided by a flip-flop 33. The violation monitor 24 compares the present frame bit with the last frame bit stored in a flip-flop 34. The frame bit is stored in flip-flop 34 from the data lead 11 when enabled by the zero signal on lead S. The comparison is made by a comparator 35, to provide a violation signal on lead V when its inputs are the same.

Figure 3:
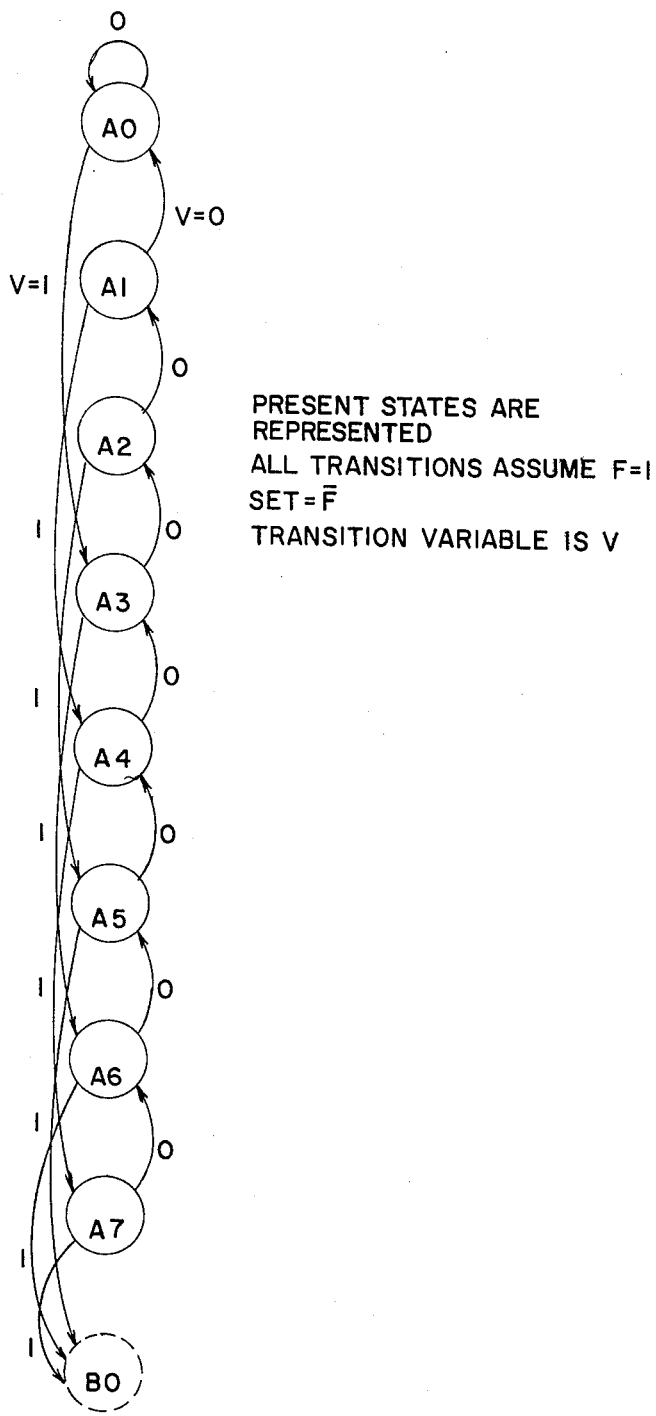
FIG. 3 is a flowchart of the normal mode states.

In the flow diagrams of FIGS. 3 and 4, all transitions assume $F = 1$, and V is the transition variable, except that the transition from BO to Bl shown as Un is unconditioned. The set signal S is zero whenever $F = 1$ or BO is true.

A generalized sequential controller may be used to implement the logic represented in FIGS. 3 and 4 by flowcharts. The control circuit must have inputs F and V, output S, eight A states, and 16 B states. Since there is a total of 24 states, theoretically only five bits of storage are needed. This may be provided by five flip-flops S1 – S5 of a hex D flip-flop chip. The extra flip-flop may be used as flip-flop 33 in the frame counter. The controller 26 requires a combinational logic circuit having seven inputs and six outputs. This circuit would be difficult to implement with small and medium scale integrated circuits and would require a number of chips. Therefore, the controller 26 is preferably a read only memory, which is very simple to implement. The modes previously designated by A and B in FIGS. 3 and 4 respectively can be distinguished by Sl being 0 and 1 respectively. Sl can be used as a misframe flag. The number of the state can be represented by S2, S3, S4, S5 viewed as a binary version of the hexadecimal state number with S2 being the least significant bit of the state number.

The read only memory 26 needs to be $2^7 \times 6 = 768$ bits. A common size currently available is 256 × 4, two of which may be used for a 256 × 8 size memory. This is 256 locations of 8 bits each. The ROM is always enabled. It is used strictly as a logic device. All flip-flops, counters, etc. are clocked by a common clock driver via link 12A in FIG. 5. No delays are needed since this is a synchronous sequential circuit. The clock signals are also used to strobe the memory outputs S01 – S05 into the flip-flops S1 – S5.

In operation, assume initially that the circuit is in frame and that there have been no recent violations. The circuit is then in normal mode state AO. When the signal on lead F becomes 1 (on bit 193), and assuming V = 0 (no violation), the input address to memory 26 is then 100 0000. The output is S = 0, and S01 – S05 are 0's so that the state in flip-flops S1 – S5 remains AO. The signal S = 0 sets the frame counter 22 to zero and clocks the framing bit into flip-flop 34. During the other 192 bits of each frame, F = 0, and the memory is programmed so that the output S = 1, and the outputs S01 – S05 are the same respectively as the input SI1 – SI5.

The next time F = 1, assume a violation occurs, for example flip-flop 34 and lead 11 both have 1's, then the output of comparator 35 is V = 1. The memory address is then 110 0000. As shown in FIG. 3, the sequence should go to A3, so the memory output is S = 0, and S01 – S05 is 01100. If the next time F = 1 the bit on lead 11 is a 0, with a 1 in flip-flop 34, there is no violation and V = 0. The memory address is 100 1100, and the output is S = 0 and S05 – S05 is 00100 for state A2. If the next two framing bits are zeros (violations), then the states advance from A2 to A5, and next to BO.

The circuit is now in search mode. On the next clock pulse F = 0, V is irrelevant, and SI1 – SI5 is 10000, so the address is OX1 0000. The output is S = 0, and S01 – S05 is 11000 for advancing to the state B1. In the meantime, the frame counter 22 has advanced one count by the clock signal on lead 12A, and is reset again to zero by the signal S = 0. Also, the next data bit is clocked into flip-flop 34. Thus, the framing has slipped one bit.

Assume that this is not the correct framing position, but that the bit just stored in flip-flop 34 is a 1, and in the next two frames the bits in this position are 0 and 1. Then each time F = 1, V = 0. For the first of these frames, the input is 101 1000 and the output is 01 0100, advancing to B2. In the next frame, the input is 101 0100 and the output is 01 1100, advancing to B3. If the next bit in this position is a 1 (violation), the input is 111 1100, and the output is 01 0000, returning to state BO. The framing then slips another bit as before, with the state unconditionally advanced to B1 on the next clock pulse. Assume then that this is the correct framing bit position and no further violations occur. The search mode state then advances each frame until BF is reached. In the next frame, the input is 101 1111 and the output is 00 0000, a return to the normal mode state AO.

DESCRIPTION OF EMBODIMENT FOR D2 CHANNEL BANK

The framing circuit for the D2 channel bank makes use of the same basic concept shown, in FIG. 1, with normal mode and search mode states. The main difference in D2 framing is that the framing bit appears only in the 193rd position in alternate frames while the other 193rd bit is used for other things such as identifying signaling frames. The framing bit alternates just as in D1. The resulting sequence in the 193rd bit position is . . . 0x1x0x1x0x1x . . . where x can be anything except the alternating sequence. As far as the reframe circuit is concerned, the frame is length 386 instead of 193 and every 386th bit is a framing bit following the same pattern as D1.

Figure 6:
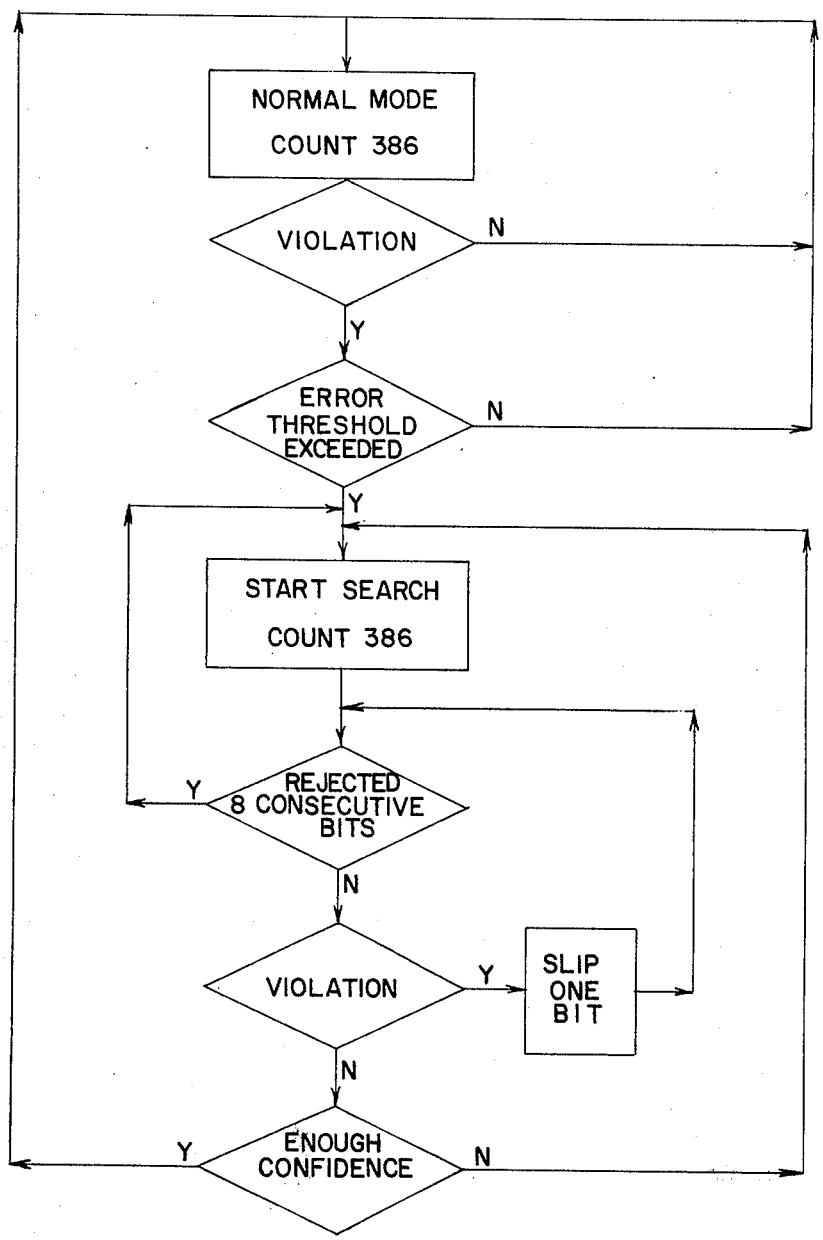
FIG. 6 is a flowchart of the basic D2 algroithm.

In order to speed up the D2 reframe process, eight bits are examined at a time. The first of the eight bits is considered to be the prime candidate and the others are considered in succession. As long as the first bit follows the correct pattern, then no action is taken until a confidence counter reaches a threshold which says that sufficient confidence in the prime candidate has been attained so that a true frame can be declared. During the time that the candidate is being considered, a history of past violations is being accumulated on the other 7 bits. In the event that the candidate fails, the second bit can be examined with a past history that indicates whether or not it should be considered. If there have been any violations in that position since the frame search began the second bit is immediately eliminated from contention and the third bit is examined in the same manner. This process continues until a contender is found or else all 8 bits are exhausted. Whenever a contender is found, then it is declared to be the new prime candidate and the confidence counter is restarted from zero. In this manner, up to eight non-framing positions can be eliminated at a time rather than having to examine each position individually. Bits which are not frame bits can be skipped over fairly rapidly so that the total reframe time is improved considerably. A general flowchart of this method is shown in FIG. 6.

In the normal mode, the sequence of states is the same as for Dl, as shown in FIG. 3. The same scheme for tolerating errors is used, i.e. when V = 1 the state value increases by 3, and when V = 0 the state value decreases by 1.

Figure 7:
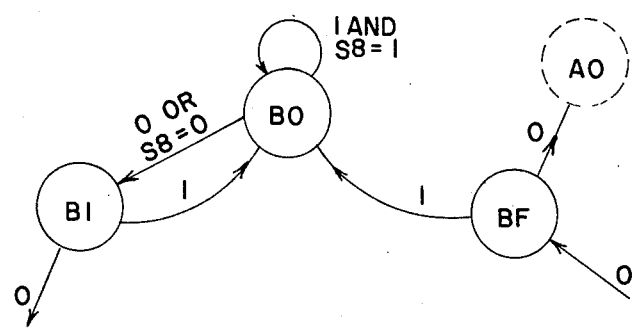
FIG. 7 is a modification of FIG. 4 for a flowchart of D2 search mode states.

The search mode sequence of states is similar to that for Dl shown in FIG. 4, except for the departure from state BO as shown in FIG. 7. There is an additional input variable S8.

Figure 8:
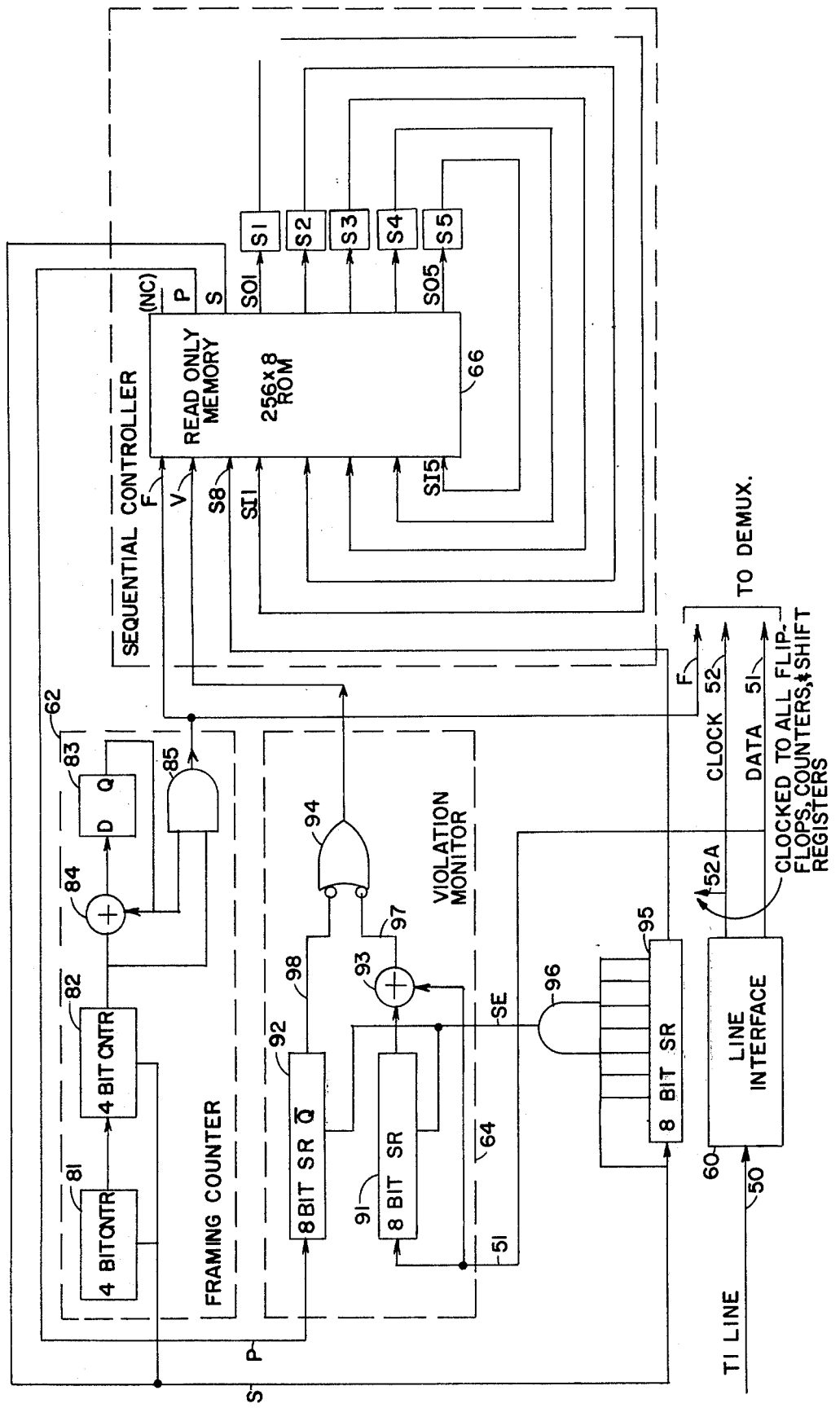
FIG. 8 is a functional block diagram of a D2 framing circuit.

The circuit for D2 framing is shown in FIG. 8. The Tl line 50 has a line interface 60 which repeats the data bit stream to lead 51 and supplies a train of clock pulses at the same frequency on lead 52.

The framing counter 62 is designed to produce an output F = 1 every second frame or 386 bits. The S input when low causes the counter to be started at its initial state. One possible organization for the counter is shown.

The violation monitor 64 comprises a data 8-bit shift register 91, a past history shift register 92, a comparator 93 for comparing the output of the shift register 91 with the current data bit, and a gate 94. The 8-bit data register 91 is needed during the search mode. In the normal mode, the frame bit must be stored in the data register 91. The old frame bit must be at the output of the data register 91 for comparison with the new frame bit. Eight clock pulses must be applied to the data register in order to get the frame bit to the end for comparison. This is accomplished by using another shift register 95 and an 8-bit low wide gate 96 to extend the 1 bit S signal (S =0) into a signal SE (Shift Enable for data and P registers) with SE =0 of width 8 bits. Whatever the length of S, the length of SE is seven bits longer. The P (Past) register 92 is used only in the search mode to store the past violation history of 8 bits. The violation output V is obtained by combining the incoming violations with the past violations via Gate 94 and the result is usually stored again through the P input.

Examples of the required functions are shown in FIG. 9. In the normal mode, F = 1 input to ROM66 results in S = 0 output therefrom, resetting the frame counter, enabling the data and P registers 91 and 92 for 8 bits, and storing all zeros for the past history of violations in register 92.

In the search mode where the correct framing bit has been acquired but not certified, the shift enable SE only allows 8 bits to enter. Since the lead bit, which is still the prime candidate, has no violation the first P bit is zero while the other P bits are equal to V which results from the past record and present value of violations of the adjacent seven positions.

In the search mode where the first three bits, for example, are in violation, the counter is set four times instead of one and SE is 4 + 7 = 11 bits long. The first three positions are discarded and their past histories are obliterated. P is also 0 in the fourth position since there is no violation in that position. The past histories of the remaining four bits are preserved along with the present values. Three more new bits must be entered into the data register. Since the V output in this case results from data samples only 8 bits apart (instead of 386), then P is set to zero in order to provide a clean slate for recording histories of these locations. The value of P does not matter when the shift registers are not enabled. Some circuit and/or control simplifications result from letting P = V at all times other than when it must be specified to be zero. The S8 signal is used to inform the controller when the eight bit interval is ended and also is used to force P = 0 in the extended period.

A generalized sequential controller comprises a read only memory 66 and flip-flops S1 – S5. Most of the discussion on a generalized sequential controller for D1 applies equally well to D2. FIG. 8 shows the controller for D2. The same set of states are used for D2. S1 is the mode control flag and can be used as misframe alarm. S2, S3, S4, and S5 are used for error rate alarm, confidence counting and control in much the same way as D1. F and V are again inputs although V conveys more information for D2. An additional input, S8, is needed to tell the controller when the eight bit window is past and also to force P to zero if the window is extended. The S output is essentially the same except that it remains low as long as up to eight consecutive violations occur. The P output is needed for storage of violation history and to clear such storage when necessary. So eight inputs are used and at least seven outputs. This is almost a perfect match for a 256 × 8 ROM (read only memory). A common and readily available ROM size is 256 × 4. Two packs are needed for the control logic. The 256 × 4 size is available in a programmable ROM (PROM). PROMs could be used initially. For large scale production, so circuit change is needed to switch to masked programmed ROMs. The given method could be implemented in a variety of integrated circuit technologies and lends itself easily to LSI (large scale integration) implementation if so desired.

Similar to the circuitry shown in FIG. 5, the circuitry of FIG. 8 contains a ROM which is used strictly as a logic device and is continuously enabled. Once again, all flip-flops, counters, and additionally the shift registers are clocked by a common clock driver via link 52A shown in FIG. 8. In the following description, the memory input addresses are given in the order F, V, S8, SI1, SI2, SI3, SI4, SI5 and the memory output in the order P, S, SO1, SO2, SO3, SO4, SO5. In encoding the mode states, S2 is the least significant bit.

In operation, assume initially that the framing circuit is in the normal mode state A0, indicating that there have been no recent violations in the framing bit. When the framing bit appears on the data lead 51, the signal from the framing counter 62 at the output of gate 85 becomes F = 1. Assume that the bit on lead 51 has a value of 1. The previous framing bit at the right-hand end of shift register 91 then has a value of 0. Comparator 93, shown as a modulo-2 adder (exclusive OR gate) has inputs 1 and 0 and an output of 1 on lead 97. This latter signal is inverted at the input of gate 94 so that signal V at the output is 0. The signal S8 is a 1, and the state A0 is encoded as all 0's on leads SI1 – SI5. Therefore, the memory input address is 1010 0000. The outputs P and S are both 0's and the mode state remains A0, so the memory output is 000 0000. The signal S = 0 resets the framing counter 62 to its initial state, and via the left input of gate 96, causes the signal SE to be 0 to provide a shift enable signal to shift registers 91 and 92. On the next clock pulse, P = 0, data = 1, and S = 0 are shifted respectively into shift registers 92, 91 and 95. All of the bits in shift register 92 are 0's, so the $\overline{Q}$ output on lead 98 is 1. The bits in shift register 91 and the lead 51 can be anything, so the output of comparator 93 and therefore the signal on lead V can be either 0 or 1. The output shift register 95 on lead S8 is a 1. Thus, the memory input address is 0X10 0000. The outputs P and S should be 0 and 1 respectively, and the mode state remains A0, so the memory output is 010 0000. The same conditions prevail for a total of seven clock pulses. The 0 in shift register 95 is shifted to the right, followed by 1's. Thus, one of the inputs of gate 96 is a 0, so that signal SE remains at 0 to enable shift registers 91 and 92. After the eighth clock pulse, the 0 in shift register 95 is at the right, and the other bits are all 1's. Since the inputs of gate 96 are from lead S and the left 7 bits of register 95, they are all 1's and the signal on lead SE becomes 1. The signal on lead S8 is now a 0. The framing bit has been shifted to the right end of register 91. The memory input address is 0X00 0000, and the output is 010 0000. During the remainder of the frame, the memory output has S = 1, and the mode state A0. The 1's from lead S continue to be shifted through shift register 95 so S8 remains at 1. For all memory addresses with F = 0, S8 = 1 and mode states other than B0, the output should provide S = 1 and an output mode state equal to the input mode state.

If the next framing bit on lead 51 is a 0 when F = 1, there is no violation. The right-hand bit of register 91 is a 1, making inputs of comparator 93 1 and 0, the output on lead 97 a 1, and the signal on lead V a 0. The conditions are thus the same as for the preceding framing bit, and the operation proceeds as described above. The mode state remains A0.

Assume now that a violation occurs, with the next framing bit a 0 on lead 51 when F = 1. With the right bit in register 91 also a 0, the signal on lead V becomes a 1. The memory input address is then 1110 0000. The outputs P and S should be 0 and 0 repectively as before, but the mode states changes to A3, making the memory output 000 1100. On the following clock pulses, the operation of the shift registers 95, 91 and 92, and the memory input and output conditions, are the same for all normal mode states A0 – A7. Thus, the bit S = 0 appears during 1 bit time and is shifted through register 95 so that the signal SE is a 0 for eight clock pulses, and then S8 becomes 0 for 1 bit time. All 0's are shifted into register 92, and in register 91 the framing bit is shifted to the right.

If the next framing bit is a 1 when F = 1, there is no violation. The output from comparator 93 is a 1, and V = 0. The memory input address is 1010 1100, and the memory output is 000 0100. The mode state has gone to A2. The operation for the next eight clock pulses is the same as for other normal mode states as already described.

The next framing bit might be a 1 when F = 1. This is a violation which causes the mode state to change from A2 to A5. The memory input and output are 1110 0100 and 000 1010 respectively.

Now a violation for the next framing bit (1) when F = 1 advances the state to BO. The memory input is 1110 1010, and the memory output becomes 001 0000. With S = 0 to reset the framing counter 62, the signal on SE is also 0 to enable shift registers 92 and 91. On the next clock pulse P = 0, data = 1, and S = 0 are shifted into registers 92, 91 and 95 respectively. Assume that in addition to the first bit violation, the next 2 bits are also in violation as shown in FIG. 9, "Search mode first bit violations", as successive bits are now examined for each clock pulse. Eight bits starting with the previous framing bit had been stored in register 91. With the circuit now in the search mode (S1 = 1), after the first bit violation, the indication on lead V is used to find a new contender for the framing bit. The second bit violation makes the output of comparator 93 a 0, and V = 1. The memory input address is now 0111 0000. Since the state is BO and S8 = 1, the mode state remains BO, with P = 0 and S = 0, making the memory output 001 0000. With the third bit also a violation, the memory input and output are the same as for the second bit. Thus, three 0's have now been shifted into register 95, and also into the past history register 92. On the fourth bit, V = 0 so this bit becomes the contender for the framing bit. The memory input address is 0011 0000, and the output is 001 1000, advancing the search mode state to B1. S = 0 resets the framing counter, and another 0 is shifted into register 95. P = 0 is also shifted into register 92, since there was no violation for this bit. For the succeeding bits, as long as S8 = 1, with F = 0, SI1 = 1, and a search mode state other than BO; the output is P = V, S = 1, and the mode state is unchanged. The memory address is 0X11 1000, and the output is X11 1000. The violations for these bits are stored in the past history register 92. There are a total of 8 bit times starting with and including the bit time in which F = 1. Since there were 3 bits rejected and the fourth was chosen as a contender, there remain 4 bits for which a past history is stored. On the next clock pulse S8 = 0, while F = 0 and the mode state is still B1. The memory address is 0X01 1000. Since the value of V results from data samples only 8 bits apart (instead of 386), P is set to 0 in order to provide a clean slate for recording histories of these locations. The value of S must continue to be one, and the mode state unchanged. The memory output is therefore 011 1000. The shift enable signal remains a 0 for 11 bit times, since S was 0 for 4 bit times and SE has a duration of seven more bit times. Therefore after S8 became 0, three more bits are entered into the data register 91, with 0's entered in the past history register 92. The value of S8 is 0 for one more bit time, and then becomes a 1 until after the next framing bit. For these memory inputs, the output must have S = 1 and the mode state unchanged.

The next time F = 1, assume there is no violation. The memory address is then 1011 1000, and the output is 001 0100 advancing the mode state to B2. On the next seven bits, if there is a past violation from register 92 on lead 98, or a present violation from comparator 93 on lead 97, then via gate 94 the signal V is 1, otherwise it is 0. This value appears at the output as P and stored in register 92, as shown in FIG. 9, "Search mode no violation".

Each time F = 1, if there is no violation for the first bit the search mode state advances by one, and the past history for the next seven bits is updated. If there is a violation on the first bit, then the mode state returns to BO to select another contender. Eventually, a contender will survive with no violations until state BF is reached.

When F = 1 next and no violation occurs, the memory address will be 1011 1111, and the memory output is 000 0000, representing a return to the normal mode state AO.

Conclusions

The proposed circuit of using a generalized sequential controller for framing results in substantial savings in complexity, pack count, design time, debugging time, space, power and cost. The circuit also lends itself easily to complete LSI (large scale integration) implementation at a later date. The circuit is totally digital and uses none of the analog devices that are used by others. The performance using the proposed circuit is superior to previous circuits and results in slightly faster average reframe time.

Note that the framing method disclosed herein could be readily adapted to other framing patterns such as those having two framing bits together in each frame or alternate frames. In such case, the violation monitor circuit might be arranged to compare two bits at a time with the expected pattern. The invention is intended to be limited only by the scope and spirit of the appended claims.

What I claim is:

1. A framing circuit for a digital receiver in which received signals comprise a train of data bits including framing bits at regular intervals, said framing bits having a predetermined pattern, counting means to count said data bits and to produce a framing signal on a given count, violation monitor means to compare said framing bits with said predetermined pattern and to produce a violation signal upon detecting a deviation from said predetermined pattern, digital controller means operative in response to said framing and violation signals to detect and record said violation signals occurring with said framing signals, and further operative whenever a predetermined violation rate threshold is exceeded to re-established correct framing;

said digital controller means comprising a read only memory having at least one output lead and a plurality of input leads and digital storage means coupled between said output and input leads of said read only memory.

2. A framing circuit for a digital receiver in which received signals comprise a train of data bits including framing bits at regular intervals, said framing bits having a predetermined pattern, counting means to count said data bits and to produce a framing signal on a framing lead on a given count, violation monitor means to compare said framing bits with said predetermined pattern and to produce a violation signal on a violation lead upon detecting a deviation from said predetermined pattern, controller means comprising only digital means, having a normal mode and a search mode with a base state, said controller means having input connections via said framing lead and said violation lead, and an output connection via a setting lead to said counting means;

said controller means effective in the normal mode to detect and record said violation signals occurring with said framing signals, reaching a threshold and changing to said search mode base state for a given function depending on the number of violations and no violation signals occurring with said framing signals;

said controller means producing a set signal on said setting lead responsive to every occurrence of said framing signal, and producing at least one extra set signal on said setting lead in said search mode base state, said set signal being effective to set said counting means to an initial state, so that a bit is slipped for said extra set signal;

said controller means effective in said search mode after said base state upon each occurrence of said framing signal to return to said base state if there is a violation signal and to return to said normal mode upon detecting and recording a given number of no said violation signals for successive occurrences of said framing signal.

3. A framing circuit as set forth in claim 2, wherein said controller comprises a read only memory, and digital storage means coupled between said output and input of said read only memory.

4. A framing circuit as set forth in claim 3, wherein said violation monitor comprises a single flip-flop, and a comparator with inputs from said single flip-flop and from a lead for said data bits and an output to violation lead.

5. A framing circuit as set forth in claim 4, wherein said data bits are in recurring frames with one framing bit each frame.

6. A framing circuit as set forth in claim 3, wherein said violation monitor comprises a first shift register with a shift input from a lead for said data bits, and a second shift register for a past history of violations, a comparator having an input from the last position of said first shift register and an input from said lead for said data bits, and gating means providing an OR function with inputs from said comparator and the last position of said second shift register and an output to said violation lead, said first and second shift registers each having X bit positions;

said controller means is effective in said search base state after each occurrence of said framing signal to examine up to X bits from said first shift register compared to current bits for violations, producing one extra set signal for each violation;

and said controller means further includes a past history output coupled to a shift input of said second shift register, with means effective in said search mode after said base state to store violation indications in said second shift register for each bit position in which a violation has occurred since entering said search mode.

7. A framing circuit as set forth in claim 6, wherein said data bits are organized into frames, with one framing bit occurring every other frame.

8. A framing circuit for a digital receiver which receives digital signals from a transmission line, wherein said digital signals have recurring frames of N data bits and M other bits, at least some of said M bits having a pre-determined pattern over a sequence of frames for framing;

input means coupled to said transmission line to receive said digital signals and to derive therefrom data signals including said data bits and said other bits on a data lead and clock signals at the same frequency on a clock leak;

a frame counter coupled to said clock lead to count said clock signals from an initial state to a given number to produce on a framing lead a framing signal coinciding with one of said M bits;

a violation monitor coupled to said data lead, comprising a framing bit store and comparison means connected to compare the contents of said framing bit store with said one of said M bits on said data lead to produce a violation signal on a violation lead if there is a deviation from said predetermined pattern;

a controller having digital means to provide a plurality of normal mode states including a normal base state and a plurality of search mode states including a search base state, said framing lead and said violation lead being connected to inputs of said controller, and a setting lead being connected from an output of said controller to said frame counter and also to enable means for said framing bit store;

said controller being operative in said normal mode states responsive to said framing signal to increase the state value toward a threshold if there is a violation signal and to decrease the state value toward or remain in said normal base state if there is no violation, said increase being more rapid than said decrease, and changing to said search base state when said threshold is exceeded;

said controller being operative on every occurrence of said framing signal to supply a set signal on said setting lead, and in said search base state to supply at least one extra set signal on said setting lead and to advance to the next search state, said frame counter being set to said initial state and a bit from said data lead being placed into said framing bit store upon each occurrence of said set signal;

said controller being further operative in said search mode states responsive to said framing signal to return to said search base mode if there is a said violation signal, and to advance the state value if there is no said violation signal, changing to said normal base state from the maximum search state value if there is no said violation signal.

9. A framing circuit as set forth in claim 8, wherein said controller comprises digital memory means, and a set of state bistable devices coupled between outputs and address inputs of said digital memory means, said framing lead and said violation lead being connected to other address inputs of said digital memory means, said setting lead being connected from an output of said digital memory means.

10. A framing circuit as set forth in claim 9, wherein said framing bit store is a single bistable device, wherein M equals one and is a framing bit every frame.

11. A framing circuit as set forth in claim 9, wherein said violation monitor comprises a first shift register with a shift input from said data lead for said framing bit store, a second shift register for a past history of violations, a comparator having an input from the last position of said first shift register and an input from said data lead, and gating means providing an OR function with inputs from said comparator and the last position of said second shift register and an output to said violation lead, said first and second shift registers each having X bit positions, said clock lead connected to clock inputs of said first and second shift registers;

said enable means for said framing bit store comprises means to provide a shift enable input to said first and second shift registers responsive to said set signals on said setting lead and for (X-1) additional clock pulses, following each occurrence of said framing signal, a connection from said enable means to a further input of said digital memory means to indicate by an "extended" signal the completion of said (X-1) additional clock pulses;

said digital memory means further having a past history output coupled to a shift input of said second shift register;

said controller in said search base state being operative to examine up to X bits, producing one of said extra set signals for each occurrence of said violation signal and for the first occurrence of said extended signal if all X bits have said violation signal;

said controller in said search mode states other than said search base state being operative following each occurrence of said framing signal to supply via said past history output signals to record the past history of violations in said second shift register for the X bits stores in said first shift register.

12. A framing circuit as set forth in claim 11, wherein M equals one, and is a framing bit in alternate frames.

13. A framing circuit for a digital receiver which receives digital signals from a transmission line, wherein every Nth bit is a framing bit and the successive framing bits have a predetermined pattern, input means coupled to said transmission line to receive said digital signals and to derive data signals on a data lead and clock signals at the same frequency on a clock lead, a frame counter coupled to said clock lead to count said clock signals and produce a framing signal on a framing lead every Nth bit, a violation monitor coupled to said data lead, comprising a framing bit store and comparison means connected to compare the contents of said framing bit store with the said Nth bit on said data lead to produce a violation signal on a violation lead if there is a deviation from said predetermined pattern, a controller having a set of inputs comprising said framing lead, said violation lead and a set of state input leads, a set of outputs comprising a setting lead and a set of state output leads, and digital memory means to produce signals on said set of outputs which are combinational logic functions of signals on said set of inputs, a set of state bistable devices coupled respectively to said state output leads to store sequence states, the outputs of said state bistable devices being coupled to corresponding ones of said state input leads, said sequence states comprising normal mode states for a threshold control and search mode states for confidence control, wherein said normal mode states include a normal base state, wherein said combinational logic functions provide that responsive to said framing signal, no said violation signal, and said normal base state at said set of inputs, said set of outputs comprise a set signal on said setting lead and signals for said normal base state; responsive to said framing signal, said violation signal, and any of said normal mode states at said set of inputs, said set of outputs comprise a set signal on said setting lead and signals to increase the normal mode state by a given plurality of steps if the result is below a preset threshold, and to a search base state is said preset threshold is exceeded; responsive to said framing signal, no said violation signal and any normal mode state other than said normal base state at said set of inputs, said set of outputs comprise a set signal on said setting lead and signals to decrease the normal mode state by less than said given plurality of steps;

wherein said search mode states include said search base state, wherein said combinational logic functions include at least one function responsive to said search base state at said set of inputs to supply at said set of outputs an extra set signal on said setting lead and to advance the search mode state, and said combinational logic functions further provide that responsive to said framing signal, said violation signal, and any search mode state other than said search base state at said set of inputs, said set of outputs comprise a set signal on said setting lead and signals to go to said search base state; and responsive to said framing signal, no said violation signal, and any search mode state other than said search base state at said set of inputs, said set of outputs comprise a set signal on said setting lead and signals to advance the search mode state, the advance from the maximum search mode state being to said normal base state;

wherein said setting lead is coupled to said frame counter and is also coupled to control said framing bit store so that said set signal sets said frame counter to an initial state, and causes a bit from said data lead to be stored into said framing bit store.

14. A framing circuit as set forth in claim 13, wherein said digital memory means comprises a plurality of word stores, each word store having an address designated by a particular combination of signals at said set of inputs, with information in each said word store providing said combinational logic functions for that particular combination of signals, and means to read said digital memory means to supply said information to said set of outputs.

15. A framing circuit as set forth in claim 14, wherein N is the number of bits in each frame, said predetermined pattern is an alternating sequence of zeros and ones for said framing bit from frame to frame;

said violation monitor comprises a single flip-flop for said framing bit store, with said comparison means being a comparator with inputs from said single flip-flop and from said data lead.

16. A framing circuit as set forth in claim 14, wherein N is the number of bits in two frames, said predetermined pattern is an alternating sequence of zeros and ones for said framing bit;

said violation monitor comprises a first shift register with a shift input from said data lead for said framing bit store, a second shift register for a past history store, said comparison means comprises a comparator with inputs from the last position of said first shift register and from said data lead, clock inputs to said first and second shift registers from said clock lead, gate means with inputs from the output of said comparator and from the last position of said second shift register and an output to said violation lead to provide an OR function for violation signals;

a third shift register having a shift input from said setting lead and a clock input from said clock lead, shift enable gate means having inputs from said setting lead and all except the last position of said third shift register and an output to shift enable inputs of said first and second shift registers, to enable said first and second shift registers whenever said set signal is on said setting lead on in any exept the last position of said third shift register; said first, second and third shift registers each having X positions;

said set of inputs for said controller further including a set extended input connected from the last position of said third shift register, said set of outputs further include a past history output connected to a shift input of said second shift register;

said controller in said normal mode states produces first condition signals at said past history output, and said set signal appears only for addresses with said framing signal present, so that said first and second shift registers are enabled for X clock pulses, shifting X data bits into said first shift register with said framing bit to the last position and all first condition signals are shifted into said second shift register;

said controller in said search base state responsive to a violation signal on said violation lead and a no set signal at said set extended input of said set of inputs produces at said set of outputs a set signal on said setting lead, a first condition signal at said past history output, and signals to remain in said search base state; and responsive to either no said violation signal on said violation lead or a set signal at said set extended input produces at said set of outputs no set signal on said setting lead, a first condition signal at said past history output, and signals to advance to the next search mode state;

said controller in said search mode states other than said search base state with no said framing signal on said framing lead, and no said set signal on said set extended lead produce at said set of outputs signals to remain in the same state, no said set signal on said setting lead, and at said past history lead a signal condition depending on the signal on said violation lead, so that the past history of violations are stored in said second shift register for the X bits in said first shift register.

* * * * *